March 28, 1939.  S. GREEN ET AL  2,151,911
EXPANSION JOINT
Filed Aug. 3, 1936  2 Sheets-Sheet 1
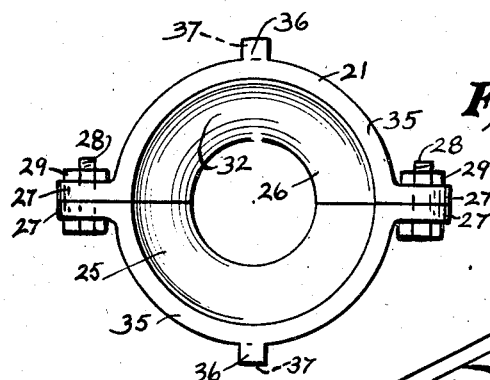
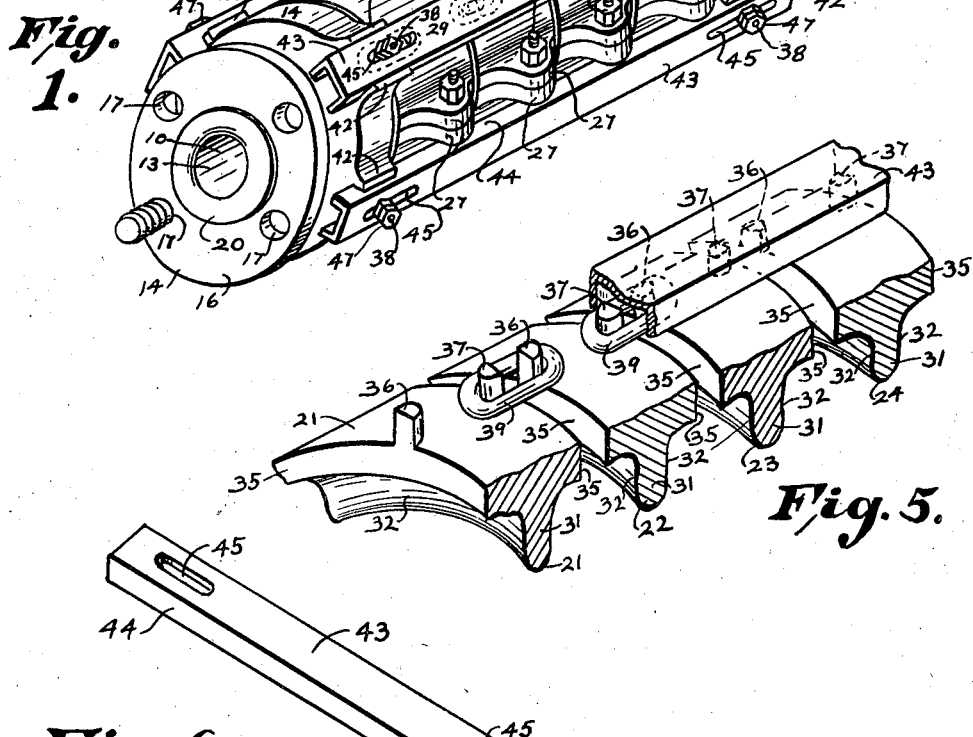
Inventors,
Solomon Green,
Isaac Spector and
Joseph Leese.
by their attorney,
J. Edward Thebaud March 28, 1939.  S. GREEN ET AL  2,151,911
EXPANSION JOINT
Filed Aug. 3, 1936   2 Sheets-Sheet 2

Inventors,
Solomon Green,
Isaac Spector,
and Joseph Leese,
by their attorney,
J. Edward Thebaud.

Patented Mar. 28, 1939

2,151,911

UNITED STATES PATENT OFFICE 2,151,911

EXPANSION JOINT

Solomon Green, Isaac Spector, and Joseph Leese, Philadelphia, Pa.

Application August 3, 1936, Serial No. 94,004

2 Claims. (Cl. 285—90)

This invention relates to expansion joints for pipe lines.

Pipe lines for conveying steam, water, air, gas or other fluids, are subjected to forces set up by the alernation of expansion and contraction, which forces not only tend to change the length of the pipe, but they set up also a twisting action. Any joint incorporated in the length of a pipe line must, of necessity be designed and constructed to withstand all such forces, and thus safeguard the central flexible, corrugated, tubular member from rupture.

While the common form of expansion joint, with its flexible corrugated tube has spaced casing rings, loosely surrounding the tube, having the tube anchored and sealed in end bolting flange rings, and at the same time is readily adapted for safe changes in length, within limits, by shortening or lengthening, however, rupture of the corrugated tube has occurred from lack of proper means to resist twisting, not only as between the ends of the joint, as a whole, but between adjoining corrugations of the corrugated tube. It is therefore one of the main objects of our invention, to provide means at the periphery of the casing rings which can be depended upon to safely limit any twisting action between adjoining rings, as well as between end rings of the casing, which will also limit the changes in length of the joint, whether that change be to shorten or lengthen the joint.

Another object is to have the means which limit the full length change in the joint, serve as a cover to the individual means which limit the movement between adjoining rings, and thus keep out dust, grit, earth and small stones from interfering with the functioning of the said individual means.

A further object is to provide an expansion joint, which, while fulfilling the above named objects, will be of a practical and simple construction and one which will lend itself to the usual methods and equipment for its manufacture.

With these and other objects which will hereinafter appear, our invention resides in certain construction, one embodiment of which is illustrated in the drawings. The same is described and its use and the functioning of the parts is explained and what we claim is set forth.

In the drawings,

Figure 1 is a perspective view of a complete expansion joint, embodying our invention.

Figure 4 is a side elevation of one of the intermediate joint rings between the end flange rings.

Figure 5 is a perspective view of fragments of adjoining rings of the joint, showing our twist resisting means mounted thereon.

Figure 6 is a perspective view of one of the longitudinal, twist resisting, channel bars.

Figure 2:
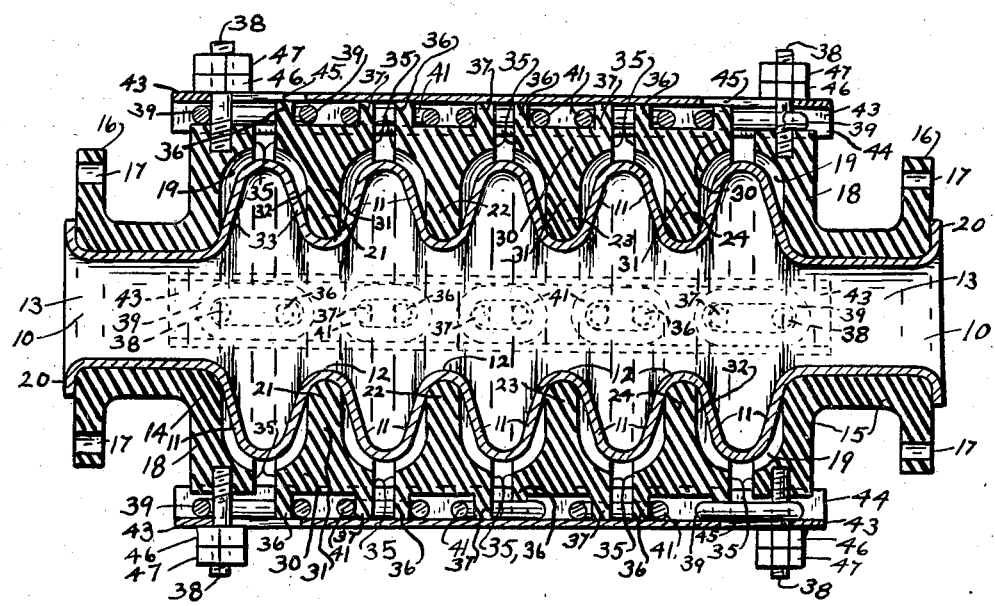
Figure 2 is a longitudinal and axial section of the joint, taken on the line 2—2 of Figure 3.
Figure 3:
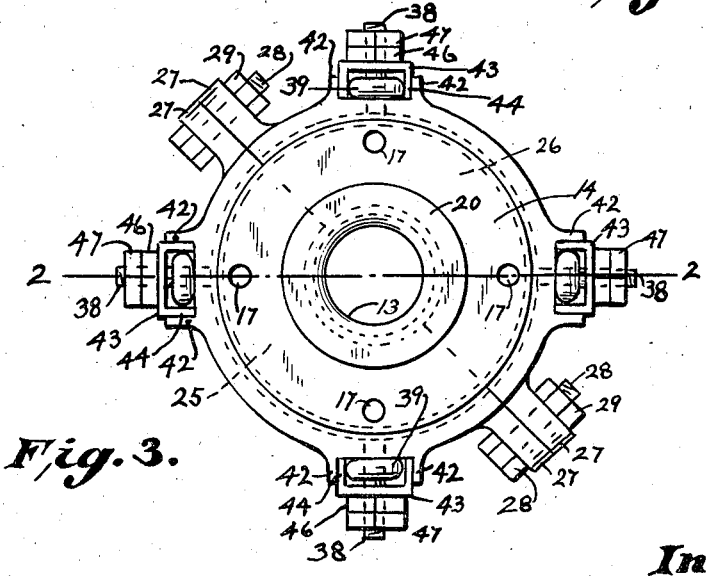
Figure 3 is an end elevation of the joint shown in Figures 1 and 2.

In the figures, the flexible corrugated tube 10 or sylphon 10, is shown to have a plurality of radially projecting corrugations 11, between which are the valley portions 12. The tube 10 has cylindrical end portions 13, tightly fitting within the large central holes in the end rings 14 and 15. Each of these rings, 14 and 15, is solid circumferentially and has a bolting flange portion 16, with bolt holes 17, and a dished flange portion 18, with a flat bottomed cupped part 19, which is larger in diameter than the corrugation 11, adjoining it. The tube 10 is flanged over at 20, at its ends, against the outside of the rings, after the end rings are slipped on to the end portions 13, of the tube 10. Loosely fitting about the valley portions 12, of the tube 10, are the intermediate rings 21, 22, 23, and 24, each of which has halves 25 and 26 with flanges 27, secured together by bolts 28 and nuts 29. Each of the intermediate rings has a peripheral flange 30, which, with the thin, inner, central, radial portion 31, of the ring, forms a T-section, considered taken radially and thereby provides a cupped pocket with a flat bottom 32, on each side of the portion 31, each being similar to the flat bottomed cupped part 19, of the end rings 14 and 15. These flat parts 32, are normal to their respective rings, of which they are a part, and adjoin the normally conical walls 33, of the corrugations 11. The walls 33 of each corrugation 11, merge in its peripheral portion 34, which is adapted to freely come within the adjoining flat pockets of adjoining rings when they come together at the flat faces 35, of their peripheral flanges 30.

Projecting from the periphery of each of the intermediate rings 21, 22, 23 and 24, and integral therewith, are four sets of link lugs 36 and 37, each set having two lugs, there being a lug in line with each of the flat faces 35. These sets of lugs are equally spaced on quarters, about the periphery of each, of the rings.

Screwed into the flange 18, of each ring to project therefrom, are the four bolts 38, spaced upon quarters, to be positioned in line with the lugs 36 and 37, of the intermediate rings 21, 22, 23 and 24. Each bolt 38, on the end ring 14, projecting therefrom, is linked to an adjoining lug 36, of the ring 21, by a link 39, having longitudinal straight sides. Each bolt 38, on the end ring 15, is linked to an adjoining lug 37. Links 41, with longitudinal straight sides, connect lugs 36 and 37, of adjoining intermediate rings as 21 and 22, 22 and 23, and, 23 and 24, all so positioned as to form four lines of links 39 and 41. Peripherally spaced on each side of each bolt 38, are projecting lugs 42, integral with the flanges 18, of the rings 14 and 15. Covering each line of links is a channel bar 43, of such a size and shape as to have its flanges 44, closely envelop the line of links 39 and 41, in sliding relation with the straight sides thereof. The bars 43 extend the full length of the joint in its full length condition, having the bolts 38 extend slidingly through longitudinal slots 45, near the ends of the bars. Nuts 46 are screwed down on the bolts 38, until they slidingly fit against the bar 43. These nuts 46 are fixed in this position with lock nuts 47. The lugs 42 are so spaced circumferentially, as to slidingly fit the end portions of the flanges 44, of the bars 43. The lugs 42 are so shaped that the inner sides are adapted to lie flat along the flanges 44, to resist any angular turning of the bar 43, from its right angled position with the plane of the flange 18, of the end ring.

While we have illustrated and described an expansion joint with bolting end flanges for connection with other bolting flanges, fixed upon parts of a pipe line, to be joined, it is evident that any other adaptable end connections may be used having the remaining construction of the joint, substantially as illustrated and above described.

In use, where our expansion joint is joined with a pipe line, and properly connected therewith, end forces, tending to compress the joint, will shorten it and may crowd all the rings 14, 21, 22, 23, 24 and 15, together until the face 35 of contiguous rings touch and prevent further compression that would tend to crush the corrugations 11. However, with faces 35 of the contiguous rings touching, and with the conical faces 33, of the corrugated tube, somewhat flattened, each corrugation still is spaced from the flat, cupped, side walls, of the thin inner portions 31, of the intermediate rings, including the cupped portions 19, of the end rings 14 and 15, and is thus saved from being crushed. As the crowding together of the rings takes place in response to the action of end compressing forces, the lugs 36 and 37, of contiguous rings, come together, as the faces 35 touch, and the links 41 come closer together, endwise, within the flanges 44, of the channel bars 43, and the outstanding bolts 38 slide in the slots 45, with respect to the bar 43, towards the inner ends of the slots. While the bar 43 thus moves, with respect to the bolts 38, the bar also slips between pairs of projecting lugs 42, on the end rings 14 and 15. This occurs with each of the bars 43, at their four circumferential positions, on quarters, around the rings. For an end force, tending to pull the joint apart, the links 39 and 41, serve, by means of the lugs 36 and 37, and the bolts 38, to hold contiguous rings from separating beyond that permitted by the length limit of the links individually, and respectively, the slots 45, not necessarily being auxiliary in their function to limit the length of the joint, as a whole, but being long enough at each bolt 38, to permit the full functioning of the links to carry the stretching strain coming on the joint.

Each bar 43 closely and slidingly fits against the line of links 39 and 41, within its flanges 44, so that the sides of these links which are preferably made straight, will lie in appreciable line contact against the inside of the bar flanges 44, and thus each link will be prevented from turning within the bar 43, and thereby will resist any twisting force tending to partially rotate any one ring with respect to its contiguous ring, or rings. The lugs 36 and 37, and the bolts 38, will thus be kept within the line of the bar 43, which envelops them, and this line will remain parallel to the axis of the joint, as a whole. The lugs 42, being in flat contact with the outer surfaces, of the bar flanges 44, tend in an auxiliary way to keep the bars 43, parallel with the axis of the joint.

Inasmuch as changes in the construction of our expansion joint can be made without departing from the spirit and scope of our invention, we wish to include all forms which come within the purview of the following claims.

We claim,

1. In an expansion joint of the character described, having a cylindrical body member made up of a series of individual cross rings, enclosing a corrugated, flexible tube, having sealed connection with the end rings of said body, connecting means upon said rings at the periphery thereof, securing contiguous rings in adjustable spaced relation, said means comprising a pair of radially projecting lugs, integral with each of said contiguous rings, said lugs being positioned in a line parallel to the axis of said body, having one of said lugs adjoining each face of each contiguous ring, a link connecting the lugs which stand opposite one another and nearest the faces of two contiguous rings to limit the spacing of said rings, and a channel bar enveloping said links in line with one another, in spaced end relation to one another, and means for slidingly securing said bar to the periphery of said body.

2. In an expansion joint of the character described, having a cylindrical body member made up of a series of individual cross rings, enclosing a corrugated, flexible tube, having fixed connection with the end rings of said body, connecting means upon said rings at the periphery thereof, securing contiguous rings in adjustable spaced relation, said means comprising a pair of radially projecting lugs, integral with said contiguous rings, one of said lugs being on one of said contiguous rings, and the other of said lugs being on the other of said contiguous rings, all of said lugs, on said cross rings being positioned in a line approximately parallel to the axis of said body, a link connecting the lugs which stand opposite one another and nearest the faces of the two contiguous rings they are on, to limit the spacing of said last mentioned rings, and longitudinal means running over all of said rings, slidingly connected with said body, at its periphery, and adapted to keep said links in line with one another.

SOLOMON GREEN.
ISAAC SPECTOR.
JOSEPH LEESE.